B. R. BEACH.
TROLLEY WHEEL AND FINDER.
APPLICATION FILED MAR. 21, 1911.
1,011,723.
Patented Dec. 12, 1911.
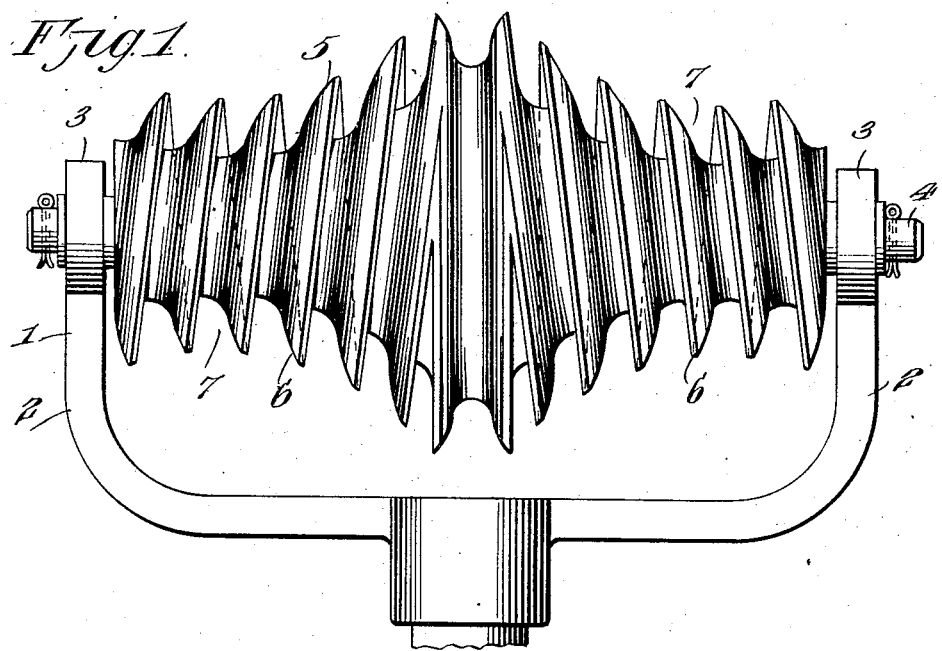
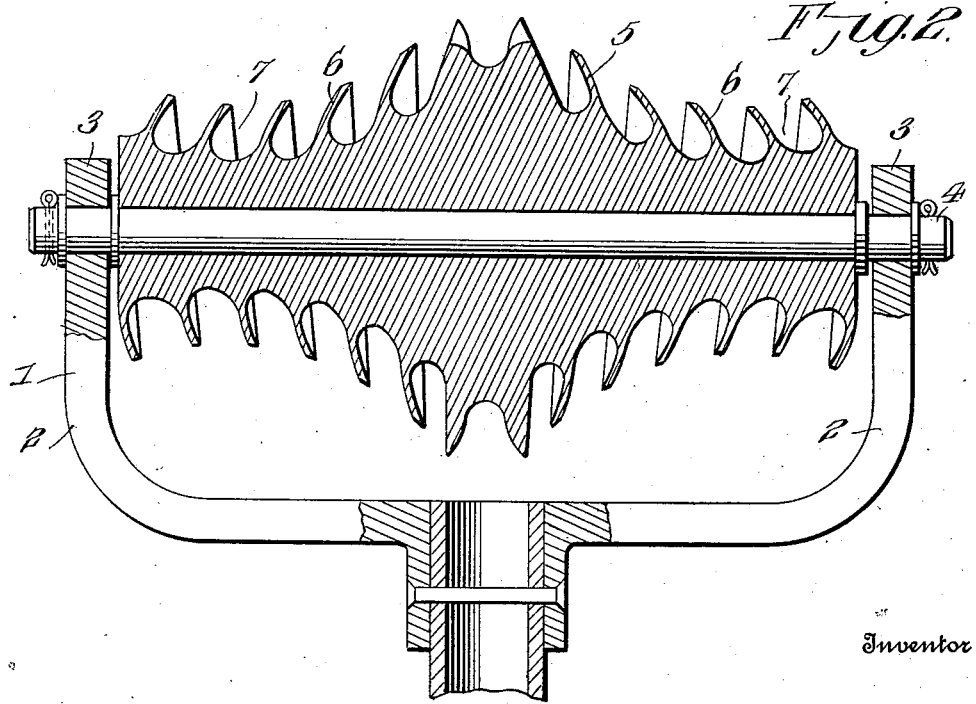
Witnesses
Frank Hough
Inventor
Benjamin R. Beach,
By Victor J. Evans
Attorney

UNITED STATES PATENT OFFICE.

BENJAMIN R. BEACH, OF FIELDSBORO, NEW JERSEY.

TROLLEY WHEEL AND FINDER.

1,011,723.  Specification of Letters Patent.  Patented Dec. 12, 1911.

Application filed March 21, 1911. Serial No. 615,859.

*To all whom it may concern:*

Be it known that I, BENJAMIN R. BEACH, a citizen of the United States, residing at Fieldsboro, in the county of Burlington and State of New Jersey, have invented new and useful Improvements in Trolley Wheels and Finders, of which the following is a specification.

This invention relates to trolley wheels and finders, the main object of the invention being to provide a trolley wheel provided on opposite sides thereof with spirally grooved rollers of novel construction, whereby the application of the trolley wheel to the wire will be facilitated, and whereby, in the event of the trolley wheel jumping the wire, one of the finders will engage the wire and automatically return the wheel into wire-engaging position.

A further object of the invention is to provide a construction in which the spirally grooved finding rollers are longitudinally concaved to clear crossing wires, as well as ears and pans at switches, and in which the walls of the spiral grooves are of such formation as to readily engage the wire and retain it, thereby facilitating the return of the trolley wheel to the wire.

The invention consists of the features of construction, combination and arrangement of parts, hereinafter fully described and claimed, reference being had to the accompanying drawing, in which:—

Figure 1 is a front elevation of a trolley harp, wheel and finders embodying my invention. Fig. 2 is a central longitudinal section through the same.

Referring to the drawing, 1 designates a trolley harp of any suitable construction, the arms 2 of which are provided with bearings 3 for the reception of the shaft or spindle 4 carrying the trolley wheel 5, which is provided with the usual circumferential groove arranged concentric with and at right angles to the axis of the wheel.

Arranged on opposite sides of the wheel 5 and between the same and the journaled ends of the axle are finding and guard rollers 6, each provided with an inwardly extending spiral groove 7 leading from the outer to the inner end thereof. These rollers may be made integral with the wheel 5, or may be formed independently thereof and fixed either to the wheel or to the shaft to revolve with the wheel.

In accordance with my invention, each roller is made of greatest diameter at its inner end, at which point the roller contacts with the side of the wheel and the spiral groove thereof communicates with the top portion of the groove of the wheel in order to lead the trolley wire thereto. The outer end of each roller is of somewhat smaller diameter than the inner end thereof but of greater diameter than the intermediate portion of the roller. As shown, each roller has its periphery longitudinally curved or concaved, said roller being of smallest diameter at a point intermediate its ends and gradually increasing in diameter therefrom toward its opposite ends. By this construction, a longitudinal dip or curvature is provided in each finding and guard roller, which adapts it to pass under crossing wires, ears and pans and other fixtures in the trolley line without coming in contact with and damaging any part of the overhead structure.

In accordance with my invention, the outer flanges of the convolutions of the spiral groove of each finding and guard roller are bent or inclined inwardly toward the wheel 5 so as to partially overhang the adjacent convolution. By this construction, such flanges are adapted to operate in the nature of retaining hooks to engage and hold the wire falling into any convolution of a spiral groove against deflection or jumping out, thus obviating any possibility of the trolley as a whole jumping the wire and facilitating the restoration of the wheel to the wire in the event of its disengagement from the wire and the jumping of the wire into the spiral groove of either roller. It will thus be understood that in case the trolley wheel leaves the wire and the latter engages in any of the convolutions of either spirally grooved roller, the wire will be prevented from jumping out of the groove by the retaining flange thereof, and that in the revolutions of the trolley as a whole the wire will be fed inward by the spiral groove until it is restored to the groove in the trolley wheel.

The advantages of the construction described will be apparent without further recitation.

Having thus described the invention, I claim:—

1. The combination with a trolley wheel, of a finder and guard disposed on each side of the trolley wheel and comprising a spirally grooved roller, the outer flanges or walls of the spiral groove being inwardly bent or deflected to partially overhang the convolutions of the groove.

2. The combination with a trolley wheel, of a finder and guard arranged on each side thereof, said finder and guard comprising a spirally grooved roller of greater diameter at its ends than at a point intermediate such ends, the outer flanges or walls of the groove being inwardly bent or deflected so as to partially overhang the convolutions of the groove.

In testimony whereof I affix my signature in presence of two witnesses.

BENJAMIN R. BEACH.

Witnesses:
JOSEPH T. COTTON,
WALTER L. THOMPSON.

Copies of this patent may be obtained for five cents each, by addressing the "Commissioner of Patents, Washington, D. C."